United States Patent [19]

Hayashihara et al.

[11] Patent Number: 5,792,807
[45] Date of Patent: Aug. 11, 1998

[54] COMPOSITION ADAPTABLE OR SUITABLE FOR BEING MARKED AND MOLDING THEREOF

[75] Inventors: Shoiti Hayashihara, Yono; Masaru Kudho, Omiya; Masaki Shinmoto, Yono; Chie Umeyama, Omiya, all of Japan

[73] Assignee: Nippon Kayaku Kabushiki Kaisha, Toyko, Japan

[21] Appl. No.: 716,583

[22] Filed: Sep. 18, 1996

Related U.S. Application Data

[63] Continuation of Ser. No. 173,831, Dec. 27, 1993, abandoned.

Foreign Application Priority Data

Jan. 19, 1993 [JP] Japan ................... 5-023203

[51] Int. Cl.$^6$ ............... C08J 5/10; C08K 3/26; C08L 23/00
[52] U.S. Cl. ............ 524/425; 524/430; 524/437; 524/451; 524/492
[58] Field of Search ................... 524/451, 437, 524/430, 425, 492, 493, 494

[56] References Cited

U.S. PATENT DOCUMENTS

| | | | |
|---|---|---|---|
| 3,860,542 | 1/1974 | Sakaguchi et al. | 260/23 H |
| 3,956,212 | 5/1976 | Sakaguchi et al. | 260/23 H |
| 5,035,983 | 7/1991 | Kiyonari et al. | 430/346 |
| 5,063,137 | 11/1991 | Kiyonari et al. | 430/292 |
| 5,206,280 | 4/1993 | Williams | 524/409 |
| 5,373,039 | 12/1994 | Sakai et al. | 524/100 |

FOREIGN PATENT DOCUMENTS

| | | |
|---|---|---|
| 0 036 680 | 2/1981 | European Pat. Off. . |
| 59-187050 | 10/1984 | Japan . |
| 60-166488 | 8/1985 | Japan . |
| 62-226554 | 11/1985 | Japan . |
| 63-216790 | 9/1988 | Japan . |
| 1-215589 | 10/1989 | Japan . |
| 2-107670 | 4/1990 | Japan . |
| 5-25317 | 2/1993 | Japan . |
| 5-92657 | 4/1993 | Japan . |

OTHER PUBLICATIONS

Database WPI–Derwent Publications Ltd.–AN 84–302892.
Database WPI–Derwent Publications Ltd.–AN 85–181516.
Database WPI–Derwent Publications Ltd.–AN 92–363307.
Modern Plastics International 23 (1993) Oct., No. 10, Lausanne, CH.
European Search Report dated Jul. 10, 1995.

*Primary Examiner*—Vasu Jagannathan
*Assistant Examiner*—U. K. Rajguru
*Attorney, Agent, or Firm*—Nields, Lemack & Dingman

[57] ABSTRACT

The present invention relates to a marking composition capable of developing a vivid white color upon the application of laser beams, which composition comprises a polyolefin resin having no fluidity at a temperature of 50° C. and at least one inorganic material selected from talc, calcium carbonate and aluminum hydroxide, wherein the inorganic material is blended in a ratio of 1–300 w/w % based upon the polyolefin resin. The invention also provides the resin moldings obtained by molding the marking compositions.

14 Claims, No Drawings

COMPOSITION ADAPTABLE OR SUITABLE FOR BEING MARKED AND MOLDING THEREOF

This application is a continuation of application Ser. No. 08/173,831 filed Dec. 27, 1993 (abandoned).

FIELD OF THE INVENTION

The present invention relates to a composition suited for marking (hereinafter referred to as marking composition), moldings obtained therefrom and a marking method. More particularly, it relates to a marking composition for forming a clear-cut mark on the surface of a thermoplastic resin molding by laser beam irradiation, with the irradiated area developing a clear white color, the resin moldings obtained from said composition and a marking method.

BACKGROUND OF THE INVENTION

Recently, as means for marking the maker's name, product name, date of production, etc., on the surfaces of various commercial products, for example, electronic parts such as IC's, resistors, condensors, inductors, etc., electrical parts such as relays, switches, connectors, printed circuit boards, etc., housings of the electrical devices, automobile parts, machine parts, cables, sheets, packaging sheets, cards, various containers of foods and medicines, caps of containers, etc., the marking method utilizing laser beams (laser marking) is used with increasing popularity because of its many advantageous features such as no-contact operation, high marking speed, easy automation and process management, etc.

In laser marking, laser beams are applied directly to the surface of an article made of a high-molecular organic material, metal or other substance to induce thermal decomposition or vaporization of a part of the article surface to cause a change of state of the surface or discoloration or decoloration of the colorant in the irradiated area, and marking is effected by making use of such changes. This marking method, however, has certain problems in practical applications. For example, in case of using a thermoplastic resin as base material for marking, the laser beams may pass through the resin, failing to perform marking thereon, or even when the laser beams are properly absorbed to do etching, it may happen that the resin is merely melted and no clear marking can be accomplished. Also, even when a colorant is used, vivid color development may fail to take place. Thus, request has been growing for a marking composition capable of developing a clear white color even when using a thermoplastic resin as base material for laser marking.

SUMMARY OF THE INVENTION

Ardent efforts by the present inventors for overcoming the above problems have led to the attainment of the present invention. Essentially, the present invention is designed to provide:

(1) A marking composition comprising a thermoplastic resin having no fluidity at a temperature of 50° C. and at least one inorganic material selected from talc, calcium carbonate, alumina, clay, magnesium oxide, aluminum hydroxide, silica, magnesium carbonate and magnesium hydroxide, said inorganic material(s) being contained in an amount of 1 to 300 w/w % based on the thermoplastic resin.

(2) A marking composition as set forth in (1) above, wherein the thermoplastic resin is polypropylene or polyethylene.

(3) A marking composition as set forth in (1) above, wherein the inorganic material is talc, calcium carbonate or aluminum hydroxide.

(4) A marking composition as set forth in (1) above, wherein the thermoplastic resin is polyethylene and the inorganic material is aluminum hydroxide, the content of aluminum hydroxide being 1 to 15 w/w % based on the polyethylene.

(5) A marking composition as set forth in (4) above, wherein the content of aluminum hydroxide is 1 to 10 w/w %.

(6) A marking composition as set forth in (4) above, wherein the content of aluminum hydroxide is 2 to 5 w/w %.

(7) A marking composition as set forth in (1) above, wherein the thermoplastic resin is polypropylene and the inorganic material is talc or calcium carbonate, the content of said inorganic material being 5 to 250 w/w %.

(8) A marking composition as set forth in (7) above, wherein the content of talc or calcium carbonate is 10 to 100 w/w %.

(9) A marking composition as set forth in (1) above, wherein the thermoplastic resin is polypropylene and the inorganic material is aluminum hydroxide, the content of aluminum hydroxide being 1 to 15 w/w % based on polypropylene.

(10) A marking composition as set forth in (9) above, wherein the content of aluminum hydroxide is 1 to 10 w/w %.

(11) A marking composition as set forth in (9) above, wherein the content of aluminum hydroxide is 2 to 5 w/w %.

(12) A resin molding obtained by molding the marking composition set forth in (1) above.

(13) A resin molding obtained by molding the marking composition set forth in (4) or (9) above at a temperature of 240° C. or below.

(14) A method for marking a resin molding which comprises applying laser beams to the resin molding set forth in (12) or (13) above.

(15) A marking method as set forth in (14) above, wherein the laser beams are far-infrared laser beams.

DETAILED DESCRIPTION OF THE INVENTION

The thermoplastic resin used in the present invention may be any of those known in the art as far as it shows plasticity when heated. Typical examples of such thermoplastic resins are polyethylenes, polyproylenes, polystyrenes, polyvinyl chloride, polyvinylidene chloride, polyvinyl acetate, polymethacrylates, polyacrylonitrile, polycarbonates, their copolymers, polyethylene terephthalate, polybutylene terephthalate, polyesters such as whole aromatic polyesters, polyurethane elastomers, polyamides, fluorine resins, polyacetals, polyether ether ketone, polyether sulfone, polysulfone, polyphenylene sulfide, polyphenylene ether, polyphenylene oxide and the like. Of these resins, polypropylenes and polyethylenes are preferred.

The thermoplastic resin used in this invention has no fluidity at a temperature of 50° C., preferably 80° C., and is preferably one whose melt index (MI) is about 0.01–60, more preferably about 0.02–55.

As the inorganic material used in this invention, powders of talc, calcium carbonate, alumina, clay, magnesium oxide, aluminum hydroxide, silica, magnesium carbonate and magnesium hydroxide can be mentioned. Of these materials, talc, calcium carbonate and aluminum hydroxide are preferred in terms of clearness of the mark. These inorganic materials may be used either singly or in combination comprising two or more of them at suitable proportions. Preferred examples of combination are: calcium carbonate/ talc, alumina/talc, silica/talc, calcium carbonate/silica, calcium carbonate/alumina, aluminum hydroxide/talc, magnesium hydroxide/talc, calcium carbonate/aluminum hydroxide, and calcium carbonate/magnesium hydroxide.

The average particle size of the inorganic material used in the present invention is 0.1 to 100µ, preferably 0.2 to 50µ, more preferably 0.5 to 10µ, and the content thereof in the composition is 1 to 300 w/w %, preferably 2 to 250 w/w % based on the thermoplastic resin. When the content is less than 1 w/w %, no vivid contrast can be obtained, and when the content exceeds 300 w/w %, the composition is badly deteriorated in moldability and can not be offered to practical use.

A further illustration of the inorganic material used in this invention is given below. When the thermoplastic resin is polyethylene for instance, it is most desirable to use aluminum hydroxide as the inorganic material. The higher the content thereof, the better in terms of clearness of the mark, but a too high content may give an adverse effect to the properties (such as embrittlement) of the composition. Therefore, in applications where importance is attached to the properties of the composition, the inorganic material is used in an amount of 1 to 20 w/w %, preferably 1 to 15 w/w %, more preferably 1 to 10 w/w %, based on the whole amount of polyethylene. A sufficiently clear mark can be obtained even when the content is less than 5 w/w %. In applications where there is no need of giving serious consideration to the properties of the masterbatch, the content of the inorganic material may even exceed 20 w/w %.

In case the thermoplastic resin is polypropylene or other resin, it is advisable to use aluminum hydroxide, talc or calcium carbonate as the inorganic material. A high content thereof is desirable for clearness of the mark, but in the case of aluminum hydroxide, a too high content may give an adverse effect to the properties of the composition as in the case of polyethylene, so that in applications where the properties are an important consideration, it is recommended to use said inorganic material in an amount of 1 to 20 w/w %, preferably 1 to 15 w/w %, more preferably 1 to 10 w/w %, based on the whole amount of polypropylene. A content below 5 w/w % can give a well satisfactory clearness of the mark. In applications where there is no need of attaching particular importance to the properties of the masterbatch, it is of course possible to use the inorganic material in an amount exceeding 20 w/w %.

It should be noted that in the case of aluminum hydroxide, because of low heat resistance, a silver stream-like mark may be formed on the surface of the molding depending on the kneading temperature with the resin or molding temperature. The upper limit of temperature safe from causing such phenomenon, although variable depending on the content of aluminum hydroxide, is about 240° C. in terms of setting temperature of the kneading or molding apparatus. This temperature limit may vary according to the composition kneading device used, residence time in the molding apparatus, pressure or frictional force exerted to the composition, and other factors.

The above phenomenon does not occur when talc or calcium carbonate is used as the inorganic material. Also, in the case of talc or calcium carbonate, its content does not greatly affect the properties of the composition, but in order to give a clear-cut mark, it is advised to use said material in an amount of at least 5 w/w %, preferably at least 8 w/w %, more preferably at least 10 w/w %, based on the whole amount of the resin.

The marking composition of this invention may contain additives as required. The additives usable in this invention include colorants, fillers, lubricant, plasticizer and the like. As colorant, there can be used various types of organic pigments such as carbon black, phthalocyanine, azo, disazo, quinacridone, anthraquinone, flavanthrone, perinone, perillene, dioxazine, condensed azo, azomethine and methine, and inorganic pigments such as titanium oxide, lead sulfate, zinc oxide, black iron oxide, chrome yellow, zinc yellow, chrome vermilion, red iron oxide, cobalt violet, ultramarine, prussian blue, chrome green, chromium oxide, and cobalt green. Organic pigments are preferred. Such organic or inorganic pigment may be added as desired in a ratio of 0.1–5.0 w/w % based on the thermoplastic resin. As filler, there can be used mica, calcium silicate, glass fiber, carbon fiber and the like. Such filler may be added in a ratio within the range of usually 0–100 w/w % based on the thermoplastic resin.

The lubricants usable as additive in this invention include stearic acid, behenic acid and its esters or salts, waxes such as carunauba wax and polyethylene wax, and various types of surfactant. Such lubricant may be added in a ratio of usually 0.1–5.0 w/w % to the thermoplastic resin. As plasticizer, there can be used esters of phthalic acid, phosphoric acid, sebacic acid and the like. Other additives commonly used in plastic working, such as antioxidant, heat stabilizer, light stabilizer, flame retardant, etc., may also be used as required.

These additives may be used in the form of powder or as a masterbatch in preparation of the marking composition of this invention.

The marking composition of the present invention can be obtained by uniformly blending a thermoplastic resin, powders of at least one of talc, calcium carbonate, alumina, clay, magnesium oxide, aluminum hydroxide, silica, magnesium carbonate and magnesium hydroxide having an average particle size of usually less than 100µ and, if necessary, an additive or additives such as colorant, filler, lubricant, plasticizer, heat stabilizer, etc., by using an extruder, twin-screw kneader, a roll mill or other suitable means.

The thus obtained composition of the present invention is molded, by a per se known method, in the form as it is or after worked into a pellet-like or marble-like masterbatch, and if necessary, further added with a thermoplastic resin and other additive(s) such as filler, to obtain a desired form of resin molding.

The resin moldings obtainable from the composition of this invention include two-dimensional moldings such as films and three-dimensional moldings such as containers, caps, parts, etc.

The two-dimensional moldings such as films can be produced by known methods such as inflation method used for film forming from thermoplastic resin, multi-layer film forming inflation method, T-die film forming method, flat film forming method comprising simultaneous or successive biaxial stretching, tubular film forming method, etc. The films produced in the manner described above can be applied to the same fields of use as the ordinary thermoplastic resin films, such as food packages, fiber packages, sundry goods packages, drug packages, tapes, insulators, agricultural films, various types of sheet, various types of seal, labels, etc. Also, the film of this invention may be attached fast to various types of base material, for example, paper such as craft paper or slick paper, plastic film, metal foil such as aluminum foil, etc., to form a laminate. Such laminate can be applied to a variety of uses such as containers of beverages such as milk and sake, drug packages, food packages, various types of sheet, various types of seal, labels, etc.

The three-dimensional moldings using the marking composition of the present invention can be obtained by using the known molding methods such as injection molding, extrusion molding, hollow molding, rotary molding, expansion molding, powder molding, vacuum molding, etc., according to the objective product to be molded. Examples of such moldings are containers of foods, detergents, drugs, cosmetics, beverages, etc., caps of such containers, food trays, tubes, medical vessels, clothing tools, housings of home electric appliances, electrical utensils, automobile parts such as bumper, interior trims for automobiles, audio devices such as tape cassette, articles for information processing devices such as floppy disc, pipes, construction materials, various types of containers, clothing receptacles, multi-layer vessels, sundries, various types of business machine, office utensils, and other commercially available molded articles mainly composed of a thermoplastic resin.

When laser beams are applied to the surface of a molded article such as mentioned above, white marking with a vivid contrast is formed in the beam-applied area. As laser, there can be used, for example, far-infrared laser such as carbon dioxide laser (wavelength: approx. 10,600 nm), near infrared laser such as YAG laser (wavelength: approx. 1,060 nm) and ultraviolet laser such as excimer laser (wavelength: approx. 190–350 nm). In this invention, far-infrared laser is preferred. The quantity of laser beams to be applied is 3–6 J/cm$^2$ in the case of TEA carbon dioxide laser.

The present invention will be further illustrated with reference to the examples, which examples, however, are merely intended to be illustrative and not to be construed as limiting the scope of the invention in any way. In the following Examples and Comparative Examples, all "parts" are by weight unless otherwise noted.

EXAMPLE 1

1,000 parts of polyethylene (UP POLYETHYLENE J110K, MI: 10, produced by Chisso Corp.), 50 parts of aluminum hydroxide (B-703, average particle size: 2μ, produced by Nihon Keikinzoku KK) and 3 parts of pigmented quinacridone red (Pigment Violet 19) were kneaded by a twin-screw kneader at 160° C. and pelletized to obtain a marking composition of the present invention. This composition was molded into a plate by using an injection molder (SAV-40 mfd. by Sanjoh Seiki KK; this model was used for injection molding in the following Examples and Comparative Examples) at 150° C. and the surface of the plate was subjected to marking by using carbon dioxide laser (XYmark 7000 produced by Cohérent Hull, Ltd.) to obtain an exceedingly clear-cut white mark.

EXAMPLE 2

1,000 parts of polyethylene (UP POLYETHYLENE J110K), 100 parts of aluminum hydroxide (B-703) and 2 parts of pigmented phthalocyanine blue (Pigment Blue 16) were kneaded by a twin-screw kneader at 160° C. and pelletized to obtain a marking composition of the present invention. This composition was injection molded into a plate at 150° C., and marking was performed on the plate surface by using carbon dioxide laser (XYmark 7000) to obtain an exceedingly clear-cut white mark.

EXAMPLE 3

1,000 parts of polyethylene (UP POLYETHYLENE J110K) and 100 parts of aluminum hydroxide (B-703) were kneaded by a twin-screw kneader at 160° C. and pelletized to obtain a marking composition of the present invention. This composition was injection molded into a plate at 150° C., and marking was conducted on the plate surface by using carbon dioxide laser (XYmark 7000) to obtain an exceedingly clear-cut white mark.

EXAMPLE 4

1,000 parts of polypropylene (TONEN POLYPROPYLENE J-215, MI: 15, produced by Tonen Corp.), 50 parts of aluminum hydroxide (B-703) and 2 parts of pigmented phthalocyanine blue (Pigment Blue 16) were kneaded by a twin-screw kneader at 200° C. and pelletized to obtain a marking composition of the present invention. The composition was injection molded into a plate at 220° C. and marking was carried out on the plate surface by using TEA carbon dioxide laser (BLAZAR 600 mfd. by Laser Technics, Ltd.) under the conditions of 26,700 V (4 J/cm$^2$) and reduction rate of 1:2 to obtain an exceedingly clear-cut white mark.

EXAMPLE 5

1,000 parts of polyethylene terephthalate (SUNPELLET 3200G produced by Asahi Kasei Kogyo KK), 30 parts of aluminum hydroxide (B-703) and 2 parts of pigmented phthalocyanine blue (Pigment Blue 16) were kneaded by a twin-screw kneader at 230° C. and pelletized to obtain a marking composition of the present invention. This composition was injection molded into a plate at 230° C. and the plate surface was subjected to marking by using carbon dioxide laser (XYmark 7000) to obtain an exceedingly clear-cut white mark.

EXAMPLE 6

1,000 parts of polypropylene (CHISSO POLYPROPYLENE K8140T, MI: 40, produced by Chisso Corp.), 300 parts of calcium carbonate (Super 1700, average particle size: 2μ, produced by Maruo Calcium KK) and 2 parts of pigmented phthalocyanine blue (C.I. Pigment Blue 16) were kneaded by a twin-screw kneader at 200° C. and pelletized to obtain a marking composition of the present invention. The composition was injection molded into a plate at 230° C. and marking was conducted on the plate surface by using carbon dioxide laser (BLAZAR 6000) under the conditions of 26,700 V (4 J/cm$^2$) and reduction rate of 1:3 to obtain an exceedingly clear-cut white mark.

EXAMPLE 7

1,000 parts of polypropylene (ASAHI KASEI POLYPROPYLENE M 1500, MI: 8, produced by Asahi Kasei Kogyo KK), 400 parts of talc (P-3, average particle size: 3μ, produced by Nippon Talc KK) and 3 parts of red pigment (KST RED E-3B, produced by Nippon Kayaku KK) were kneaded by a twin-screw kneader at 200° C. and pelletized to obtain a marking composition of the present invention. The composition was injection molded into a plate at 230° C. and marking was carried out on the plate surface by using carbon dioxide laser (BLAZAR 6000) under the conditions

EXAMPLE 8

1,000 parts of polypropylene used in Example 7, 100 parts of calcium carbonate (Super 1700, average particle size: 2μ), 100 parts of talc (P-3, average particle size: 3μ) and 3 parts of pigmented phthalocyanine green (C.I. Pigment Green 7) were kneaded by a twin-screw kneader at 200° C. and pelletized to obtain a marking composition of the present invention. The composition was injection molded into a plate at 230° C. and marking was performed on the plate surface by using carbon dioxide laser (BLAZAR 6000) under the conditions of 26,700 V (4 J/cm$^2$) and reduction rate of 1:3 to obtain an exceedingly clear-cut white mark.

EXAMPLE 9

1,000 parts of polyethylene (SUNTEC, M6545, MI; 45, produced by Asahi Kasei Kogyo KK), 300 parts of alumina (A-33F, average particle size: 0.7μ, produced by Nihon Keikinzoku KK) and 2 parts of pigmented quinacridone red (C.I. Pigment Violet 19) were kneaded by a twin-screw kneader at 200° C. and pelletized to obtain a marking composition of the present invention. The composition was injection molded into a plate at 170° C. and marking was conducted on the plate surface by using carbon dioxide laser (BLAZAR 6000) under the conditions of 26,700 V (4 J/cm$^2$) and reduction rate of 1:3 to obtain a clear-cut white mark.

EXAMPLE 10

1,000 parts of polyethylene used in Example 9, 300 parts of silica (RD-8 with an average particle size of 15μ, produced by Tatsumori KK) and 2 parts of pigmented phthalocyanine blue (C.I. Pigment Blue 16) were kneaded by a twin-screw kneader at 200° C. and pelletized to obtain a marking composition of the present invention. This composition was injection molded into a plate at 180° C. and marking was carried out on the plate surface by using carbon dioxide laser (BLAZAR 6000) under the conditions of 26,700 V (4 J/cm$^2$) and reduction rate of 1:3 to obtain a clear-cut white mark.

EXAMPLE 11

1,000 parts of polyethylene terephthalate (SUNPET 3200G produced by Asahi Kasei Kogyo KK), 1,500 parts of clay and 5 parts of pigmented phthalocyanine blue (C.I. Pigment Blue 16) were kneaded by a twin-screw kneader at 200° C. and pelletized to obtain a marking composition of the present invention. This composition was injection molded into a plate at 250° C. and marking was performed on the plate surface by using carbon dioxide laser (BLAZAR 6000) under the conditions of 26,700 V (4 J/cm$^2$) and reduction rate of 1:3 to obtain a clear-cut white mark.

EXAMPLE 12

1,000 parts of polyethylene terephthalate used in Example 11, 1,000 parts of magnesium oxide (produced by Ube Kagaku Kogyo KK) and 5 parts of red pigment (KST RED E-3B produced by Nippon Kayaku KK) were kneaded by a twin-screw kneader at 200° C. and pelletized to obtain a marking composition of the present invention. This composition was injection molded into a plate at 250° C. and marking was carried out on the plate surface by using carbon dioxide laser (BLAZAR 6000) under the conditions of 26,700 V (4 J/cm$^2$) and reduction rate of 1:3 to obtain a clear-cut white mark.

EXAMPLE 13

1,000 parts of polypropylene used in Example 7, 800 parts of magnesium carbonate (produced by Tokuyama Soda KK) and 5 parts of pigmented phthalocyanine green (C.I. Pigment Green 7) were kneaded by a twin-screw kneader at 200° C. and pelletized to obtain a marking composition of the present invention. The composition was injection molded into a plate at 250° C. and marking was carried out on the plate surface by using carbon dioxide laser (BLAZAR 6000) under the conditions of 26,700 V (4 J/cm$^2$) and reduction rate of 1:3 to obtain a clear-cut white mark.

EXAMPLE 14

1,000 parts of polycarbonate (TAFLON SC-250 produced by Idemitsu Petrochemical Corp.), 400 parts of magnesium hydroxide and 3 parts of pigmented phthalo- cyanine blue (C.I. Pigment Blue 16) were kneaded by a twin-screw kneader at 200° C. and pelletized to obtain a marking composition of the present invention. This composition was injection molded into a plate at 250° C. and marking was prosecuted on the plate surface by using carbon dioxide laser (BLAZAR 6000) under the conditions of 26,700 V (4 J/cm$^2$) and reduction rate of 1:3 to obtain a white mark.

EXAMPLE 15

1,000 parts of polypropylene used in Example 7, 150 parts of calcium carbonate (Super 1700, average particle size: 2μ), 50 parts of talc (P-3, average particle size: 3μ), 50 parts of aluminum hydroxide (B-703) and 3 parts of red pigment (KST RED E-3B) were kneaded by a twin-screw kneader at 200° C. and pelletized to obtain a marking composition of the present invention. The composition was injection molded into a plate at 230° C. and marking was performed on the plate surface by using carbon dioxide laser (BLAZAR 6000) under the conditions of 26,700 V (4 J/cm$^2$) and reduction rate of 1:3 to obtain an exceedingly clear-cut white mark.

EXAMPLE 16

1,000 parts of polypropylene used in Example 7, 200 parts of talc, 50 parts of alumina (A-33F, average particle size: 0.7μ, produced by Nihon Keikinzoku KK) and 3 parts of pigmented phthalocyanine blue (C.I. Pigment Blue 16) were kneaded by a twin-screw kneader at 200° C. and pelletized to obtain a marking composition of the present invention. This composition was injection molded into a plate at 230° C. and marking was performed on the plate surface by using carbon dioxide laser (SAV-40) under the conditions of 26,700 V (4 J/cm$^2$) and reduction rate of 1:3 to obtain an exceedingly clear-cut white mark.

EXAMPLE 17

1,000 parts of polypropylene used in Example 7, 200 parts of talc (P-3, average particle size: 3μ), 200 parts of silica (RD-8, average particle size: 15μ) and 3 parts of pigmented phthalocyanine blue (C.I. Pigment Blue 16) were kneaded by a twin-screw kneader at 200° C. and pelletized to obtain a marking composition of the present invention. This composition was injection molded into a plate at 250° C. and the plate surface was subjected to marking by using carbon dioxide laser (BLAZAR 6000) under the conditions of 26,700 V (4 J/cm$^2$) and reduction rate of 1:3 to obtain an exceedingly clear-cut white mark.

EXAMPLE 18

1,000 parts of polypropylene (CHISSO POLYPROPYLENE K8140T MI: 40), 300 parts of calcium carbonate (Super 1700, average particle size: 2μ) and 2 parts of pigmented phthalocyanine blue (C.I. Pigment Blue 16) were kneaded by a twin-screw kneader at 200° C. and pelletized to obtain a marking composition of the present invention. This composition was injection molded into a plate at 230° C. and marking was performed on the plate surface by using carbon dioxide laser (BLAZAR 6000) under the conditions of 26,700 V (4 J/cm$^2$) and reduction rate of 1:3 to obtain an exceedingly clear-cut white mark.

EXAMPLE 19

1,000 parts of polypropylene used in Example 18 and 250 parts of aluminum hydroxide (B-703, average particle size: 0.4μ) were kneaded by a twin-screw kneader at 200° C. and pelletized to obtain a marking composition of the present invention. This composition was injection molded into a plate at 230° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 20

1,000 parts of polypropylene used in Example 7 and 1,000 parts of aluminum hydroxide (B-703) were kneaded by a twin-screw kneader at 200° C. and pelletized to obtain a marking composition of the present invention. The composition was injection molded into a plate at 230° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 21

1,000 parts of polyethylene (SUNTEC. M6545), 2,500 parts of aluminum hydroxide (B-303 produced by Nihon Keikinzoku KK, average particle size: 30μ) and 5 parts of pigmented quinacridone red (C.I. Pigment Violet 19) were kneaded by a twin-screw kneader at 200° C. and pelletized to obtain a marking composition of the present invention. This composition was injection molded into a plate at 180° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 22

1,000 parts of polystyrene (IDEMITSU STYROL GP HF10, MI: 30, produced by Idemitsu Petrochemical Corp.), 1,000 parts of aluminum hydroxide (B-153 produced by Nihon Keikinzoku KK, average particle size: 15μ) and 3 parts of pigmented phthalocyanine blue (C.I. Pigment Blue 16) were kneaded by a twin-screw kneader at 200° C. and pelletized and pelletized to obtain a marking composition of the present invention. This composition was injection molded into a plate at 200° C. and marking was conducted on the plate surface by using carbon dioxide laser (BLAZAR 6000) at 26,700 V (4 J/cm$^2$) and reduction rate of 1:2 to obtain a quite clear-cut white mark.

EXAMPLE 23

1,000 parts of polyethylene terephthalate (SUNPET 3200G), 400 parts of aluminum hydroxide (B-103 produced by Nihon Keikinzoku KK, average particle size: 8μ) and 5 parts of isoindolinone yellow (Irgazine Yellow 3RL produced by Ciba Geigy Corp.) were kneaded by a twin-screw kneader at 200° C. and pelletized to obtain a marking composition of the present invention. This composition was injection molded into a plate at 240° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 24

1,000 parts of polybutylene terephthalate (TEIJIN PBT C 7000 produced by Teijin Co., Ltd.), 400 parts of aluminum hydroxide (B-303, average particle size: 30μ) and 3 parts of pigmented phthalocyanine blue (C.I. Pigment Blue 7) were kneaded by a twin-screw kneader at 200° C. and pelletized to obtain a marking composition of the present invention. This composition was injection molded into a plate at 240° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 25

1,000 parts of ABS resin (SAIKOLAC EX102 produced by Ube Saikon KK) and 100 parts of aluminum hydroxide (B-153, average particle size: 15μ) were kneaded by a twin-screw kneader at 200° C. and pelletized to obtain a marking composition of the present invention. This composition was injection molded into a plate at 200° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 26

1,000 parts of polyvinyl chloride (KANE-VINYL COMPOUND KVC I-229C produced by Kanegafuchi Kagaku Kogyo KK), 500 parts of aluminum hydroxide (BW-53 produced by Nihon Keikinzoku KK, average particle size: 50μ) and 2 parts of carbon black (MA-100, produced by Mitsubishi Chemical Industries, Ltd.) were kneaded by a twin-screw kneader at 140° C. and pelletized to obtain a marking composition of the present invention. This composition was injection molded into a plate at 150° C. and marking was performed on the plate surface by using carbon dioxide laser (BLAZAR 6000) at 26,700 V (4 J/cm$^2$) and reduction rate of 1:2 to obtain an exceedingly clear-cut white mark.

EXAMPLE 27

1,000 parts of polyethylene (UP POLYETHYLENE J110K produced by Chisso Corp.), 100 parts of aluminum hydroxide (B-703 produced by Nihon Keikinzoku KK) and 2 parts of pigmented phthalocyanine blue (Pigment Blue 16) were kneaded by a twin-screw kneader at 160° C. and pelletized to obtain a marking composition of the present invention. This composition was injection molded into a 22 mmφ, 5 mm high cap at 150° C. and marking was performed on the cap surface by using carbon dioxide laser (XYmark 7000) to obtain an exceedingly clear-cut white mark.

EXAMPLE 28

1,000 parts of polyethylene used in Example 27, 100 parts of aluminum hydroxide (B-703) and 2 parts of pigmented phthalocyanine blue (Pigment Blue 16) were kneaded by a twin-screw kneader at 160° C. and passed through the rolls to obtain a marking composition of this invention as a 500μ thick film. Marking was performed on the film surface by using carbon dioxide laser (XYmark 7000) to obtain an exceedingly clear-cut white mark.

EXAMPLE 29

1,000 parts of polyethylene (UP POLYETHYLENE J110K), 30 parts of aluminum hydroxide (B-703) and one part of pigmented phthalocyanine blue (Pigment Blue 16) were blended and the blend was kneaded by a twin-screw kneader at 160° C. and pelletized to obtain a marking composition of the present invention. The pellets were molded into a plate by an injection molder (SAV-40) at 160° C. and marking was performed on the plate surface by using carbon dioxide laser (XYmark 7000) to obtain an exceedingly clear-cut white mark.

Comparative Example 1

1,000 parts of polyethylene (UP POLYETHYLENE J110K) was injection molded into a plate at 150° C. and marking was performed on the plate surface by using carbon dioxide laser (XYmark 7000), but no mark could be formed.

Comparative Example 2

A mixture of 1,000 parts of polyethylene used in Comparative Example 1 and 2 parts of pigmented phthalocyanine blue (Pigment Blue 16) was injection molded into a plate at 150° C. and marking was performed on the plate surface by using carbon dioxide laser (XYmark 7000), but no mark could be obtained.

Comparative Example 3

1,000 parts of polypropylene (CHISSO POLYPROPYLENE K8140T) and 2 parts of pigmented phthalocyanine blue (C.I. Pigment Blue 16) were kneaded by a twin-screw kneader at 200° C. and pelletized to obtain a comparative marking composition. This composition was injection molded into a plate at 230° C. and marking was performed on the plate surface by using carbon dioxide laser (BLAZAR 6000) at 26,700 V (4 J/cm$^2$) and reduction rate of 1:3. But no mark could be formed.

Comparative Example 4

1,000 parts of polyethylene (SUNTEC. M6545) and 2 parts of pigmented quinacridone red (C.I. Pigment Violet 19) were kneaded by a twin-screw kneader at 200° C. and pelletized to obtain a comparative marking composition. This composition was injection molded into a plate at 170° C. and marking was performed on the plate surface by using carbon dioxide laser (BLAZAR 6000) at 26,700 V (4 J/cm$^2$) and reduction rate of 1:3. But no mark could be formed.

The results of visual evaluation of color development of the marks on the molded articles obtained in the above Examples and Comparative Examples are shown in Table 1.

TABLE 1

| | Resin | Inorganic material | Vividness of developed color |
|---|---|---|---|
| Example 1 | PE | Aluminum hydroxide | ⊙ |
| Example 2 | PE | Aluminum hydroxide | ⊙ |
| Example 3 | PE | Aluminum hydroxide | ⊙ |
| Example 4 | PP | Aluminum hydroxide | ⊙ |
| Example 5 | PET | Aluminum hydroxide | ⊙ |

TABLE 1-continued

| | Resin | Inorganic material | Vividness of developed color |
|---|---|---|---|
| Example 6 | PP | Calcium carbonate | ⊙ |
| Example 7 | PP | Talc | ⊙ |
| Example 8 | PP | Calcium carbonate/talc | ⊙ |
| Example 9 | PP | Alumina | o |
| Example 10 | PE | Silica | o |
| Example 11 | PET | Clay | o |
| Example 12 | PET | Magnesium oxide | o |
| Example 13 | PP | Magnesium carbonate | o |
| Example 14 | PC | Magnesium hydroxide | Δ |
| Example 15 | PP | Calciumcarbonate/talc/aluminum hydroxide | ⊙ |
| Example 16 | PP | Talc/alumina | ⊙ |
| Example 17 | PP | Talc/silica | ⊙ |
| Example 18 | PP | Calcium carbonate | ⊙ |
| Example 19 | PP | Aluminum hydroxide | ⊙ |
| Example 20 | PP | Aluminum hydroxide | ⊙ |
| Example 21 | PE | Aluminum hydroxide | ⊙ |
| Example 22 | PS | Aluminum hydroxide | ⊙ |
| Example 23 | PET | Aluminum hydroxide | ⊙ |
| Example 24 | PBT | Aluminum hydroxide | ⊙ |
| Example 25 | ABS | Aluminum hydroxide | ⊙ |
| Example 26 | PVC | Aluminum hydroxide | ⊙ |
| Example 27 | PE | Aluminum hydroxide | ⊙ |
| Example 28 | PE | Aluminum hydroxide | ⊙ |
| Example 29 | PE | Aluminum hydroxide | ⊙ |
| Comparative Example 1 | PE | — | x |
| Comparative Example 2 | PE | — | x |
| Comparative Example 3 | PP | — | x |
| Comparative Example 4 | PE | — | x |

Evaluation was made on the following criterion:
⊙: very vivid development of white color
o: vivid development of white color
Δ: recognizable development of white color
x: no development of color As is seen from the above table, it is possible to form marks on the thermoplastic resin moldings using the compositions of the present invention by applying laser beams to the moldings. It is notable that the exceedingly clear-cut marks can be obtained when aluminum hydroxide, calcium carbonate or talc is used as the color developer.

What is claimed is:

1. A marking composition consisting essentially of a polyolefin resin having no fluidity at a temperature of 50° C. and calcium carbonate, said calcium carbonate being blended with said polyolefin resin in an amount of 1–300 w/w % based upon said polyolefin resin, said marking composition forming a white mark upon irradiation with laser beams.

2. A marking composition according to claim 1, wherein the amount of said aluminum hydroxide based upon said polyethylene is 1–15 w/w %.

3. A marking composition according to claim 2, wherein the amount of aluminum hydroxide based upon said polyethylene is 1–10 w/w %.

4. A marking composition according to claim 2, wherein the amount of aluminum hydroxide based upon said polyethylene is 2–5 w/w %.

5. A marking composition according to claim 1, wherein the polyolefin resin is polypropylene and the amount of said calcium carbonate based upon said polypropylene is 5–250 w/w %.

6. A marking composition according to claim 5, wherein the amount of calcium carbonate based upon said polypropylene is 10–100 w/w %.

7. A marking composition according to claim 1, wherein the amount of said aluminum hydroxide based upon said polypropylene is 1–15 w/w %.

8. A marking composition according to claim 7, wherein the amount of aluminum hydroxide based upon said polypropylene is 1–10 w/w %.

9. A marking composition according to claim 7, wherein the amount of aluminum hydroxide based upon said polypropylene is 2–5 w/w %.

10. A resin molding obtained by molding the marking composition set forth in claim 1.

11. A resin molding composition obtained by molding the marking composition set forth in claim 4 or 9 at a temperature effective for molding, said temperature being 240° C. or below.

12. A marking composition consisting essentially of polyethylene and aluminum hydroxide, wherein said aluminum hydroxide is blended in an amount of 1–20 w/w % based on the polyethylene, said marking composition forming a white mark upon irradiation with laser beams.

13. A marking composition consisting essentially of polypropylene and aluminum hydroxide, wherein said aluminum hydroxide is blended in an amount of 1–20 w/w % based on the polypropylene, said marking composition forming a white mark upon irradiation with laser beams.

14. A resin molding obtained by molding the marking composition according to claim 12 or 13.

* * * * *